Patented Aug. 10, 1954

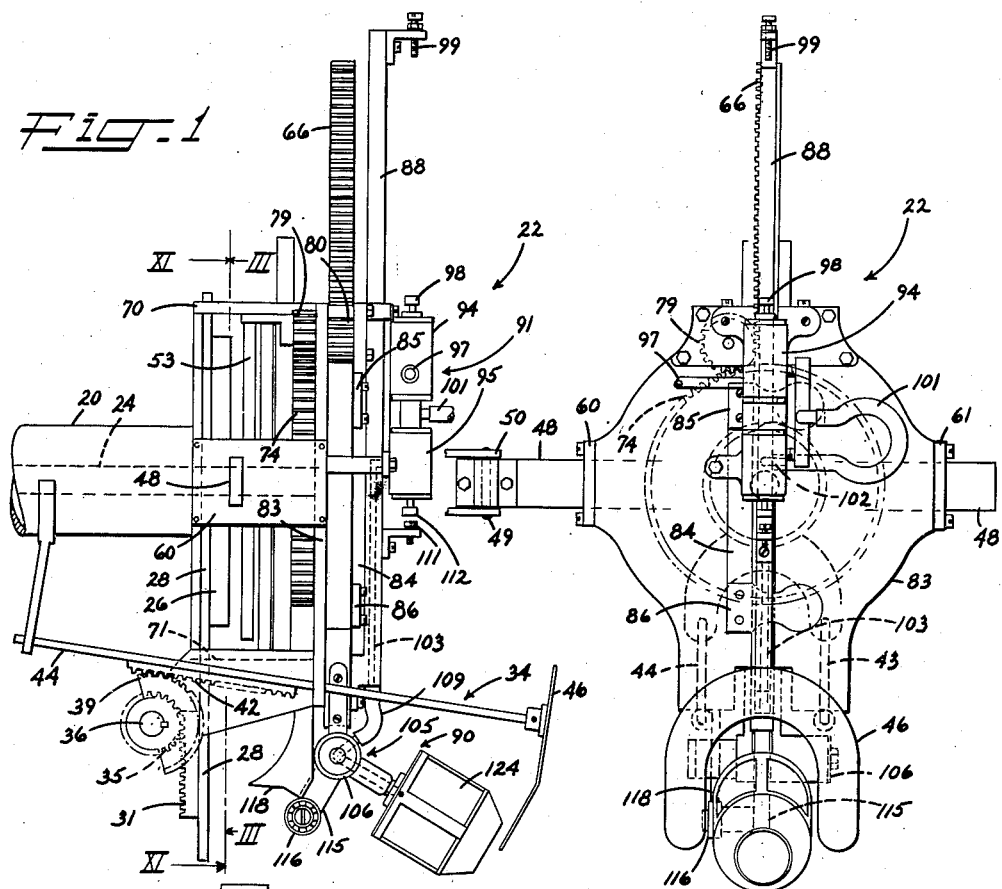

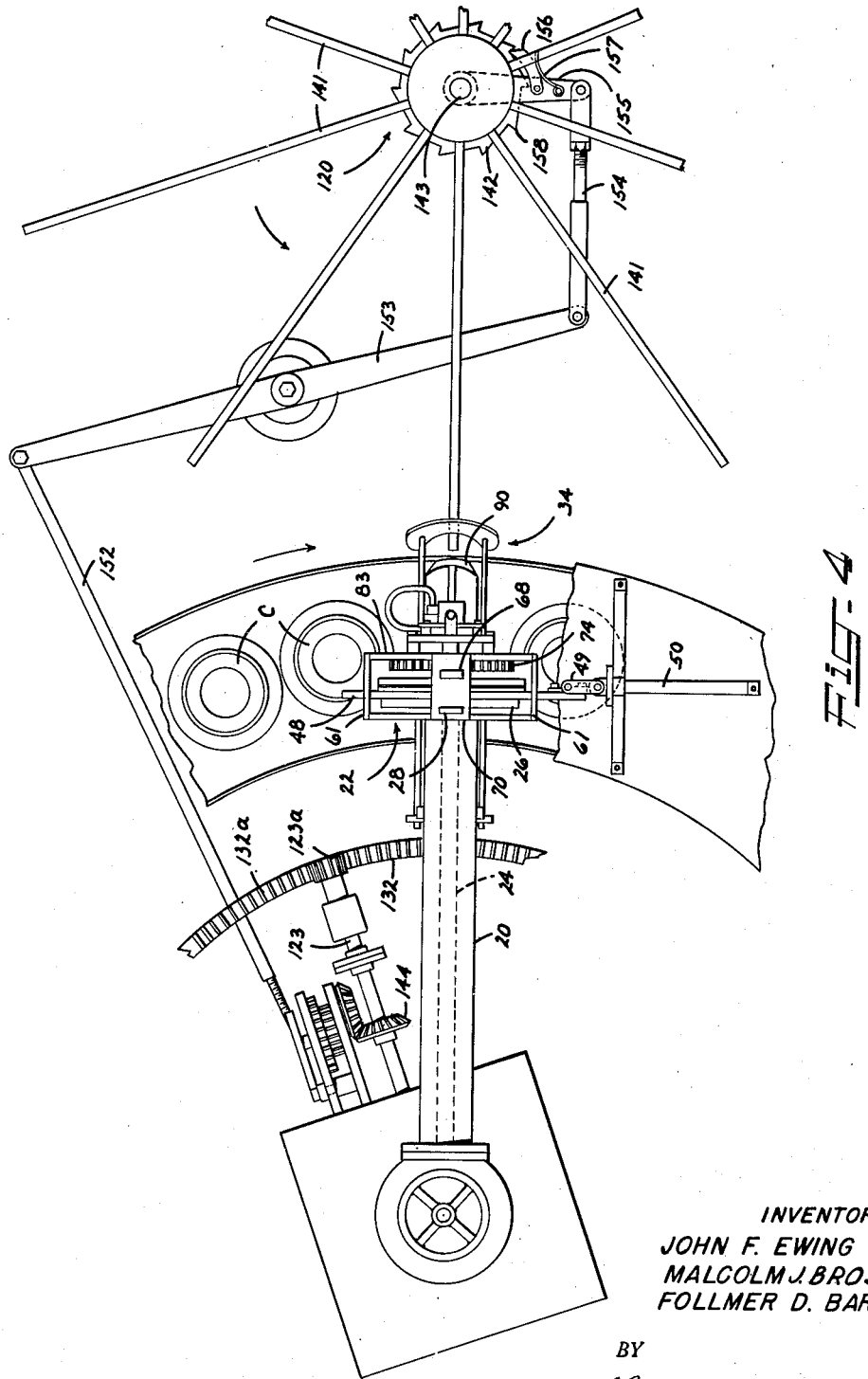

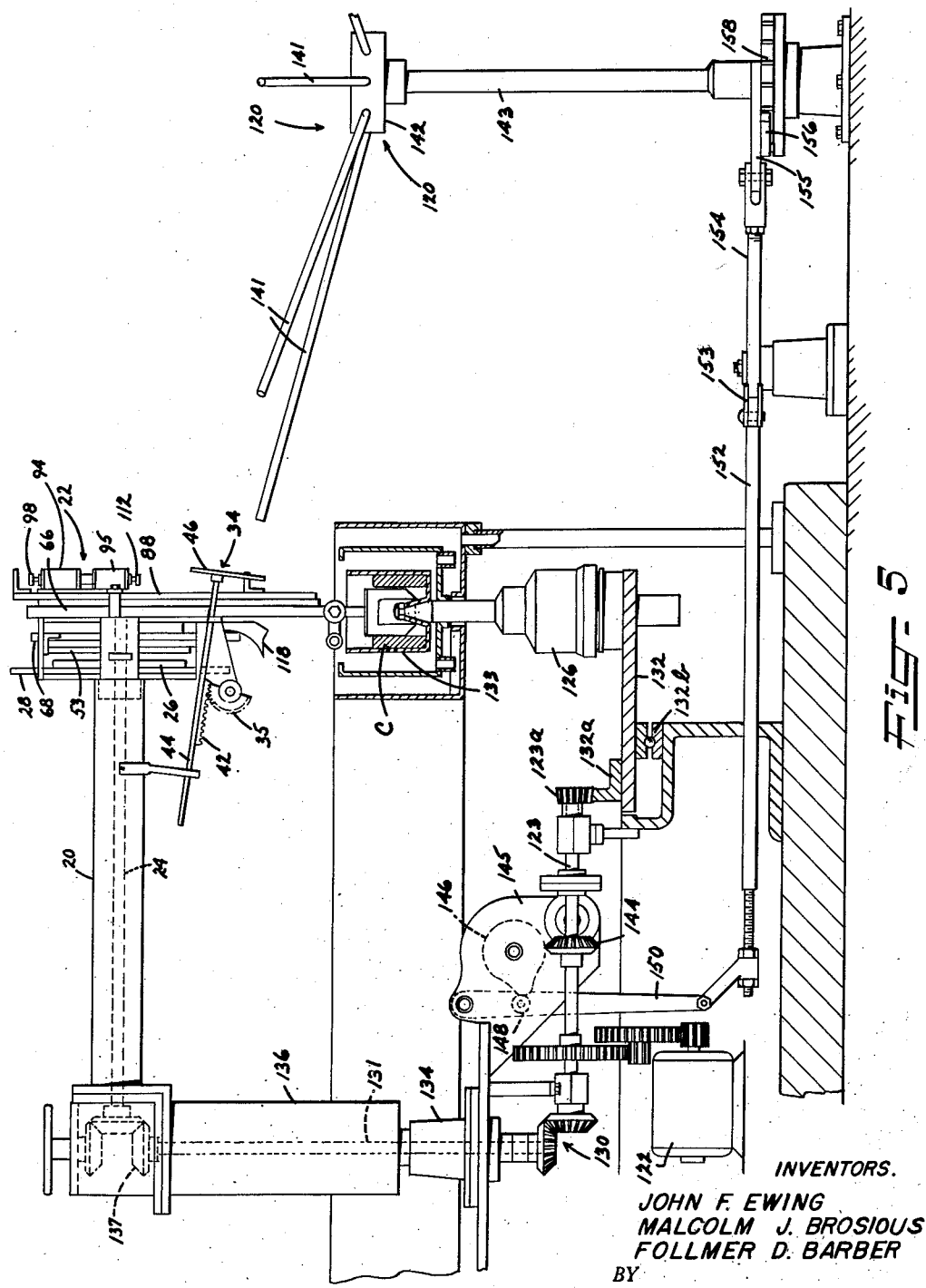

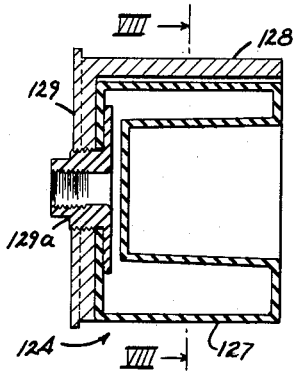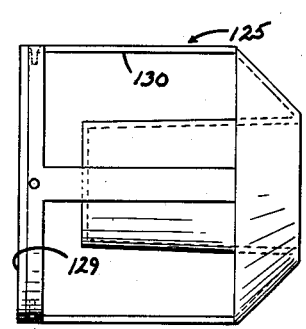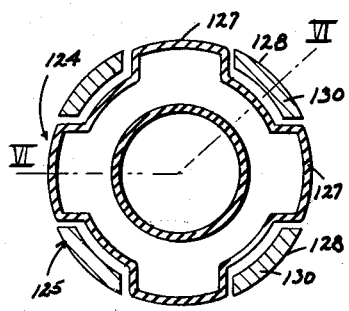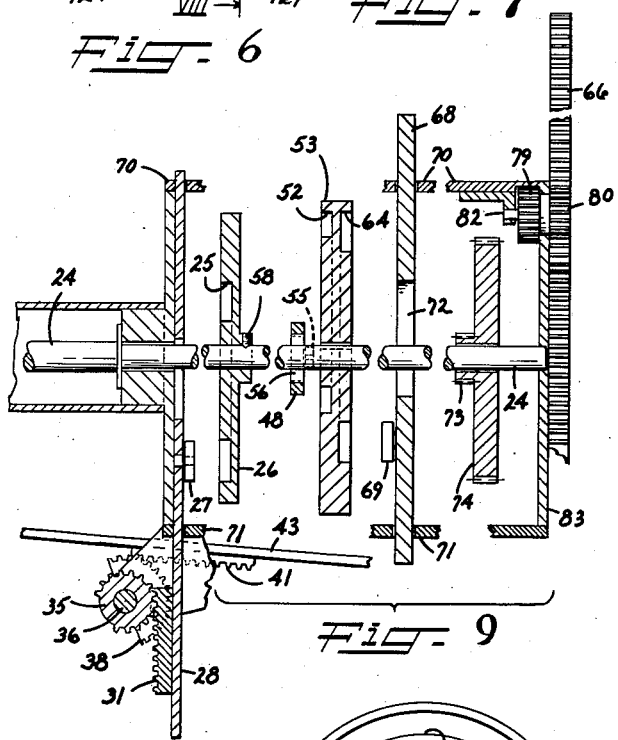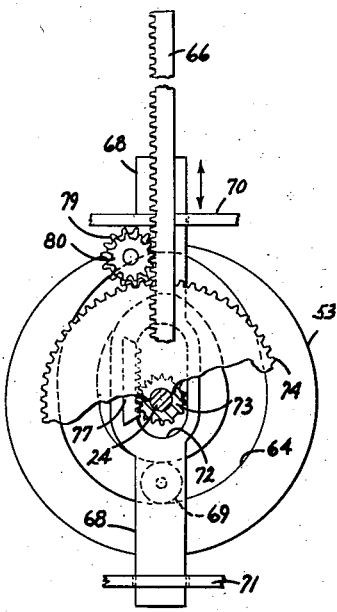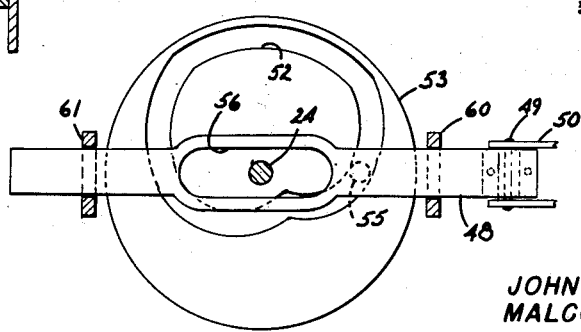

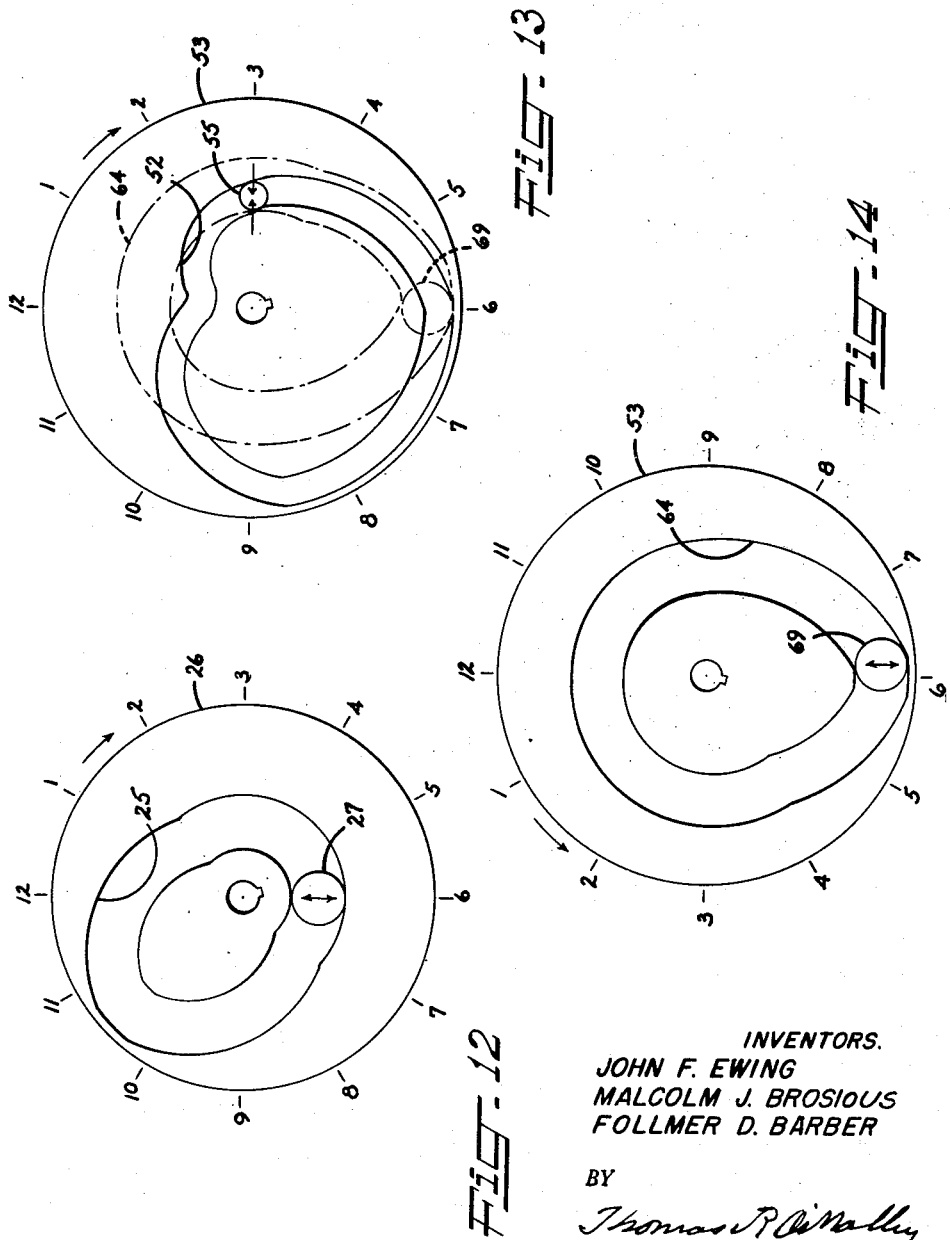

2,685,971

UNITED STATES PATENT OFFICE 2,685,971

ARTICLE EXTRACTING DEVICE

John F. Ewing, Malcolm J. Brosious, and Follmer D. Barber, Lewistown, Pa., assignors to American Viscose Corporation, Wilmington, Del., a corporation of Delaware Application December 23, 1948, Serial No. 67,062

13 Claims. (Cl. 214—1)

This invention relates to apparatus for removing annular articles from a continuously moving support therefor such as when packages of a textile strand are transported through and then removed from processing equipment.

The invention is readily adaptable to any manufacturing process wherein it is desired to transfer articles one by one from a continuously moving conveyor system to a receptacle, packaging machine, hanger, or the like. However, since an important advantage of the present invention is the ability to remove an annular article from a closely fitting container therefor, it is hereinafter described in connection with a machine with which the apparatus is synchronized for centrifuging liquid from wet cakes of rayon yarn. The machine comprises a number of buckets spaced uniformly and carried about a common center. Each bucket contains a single cake which is rotated about its own axis at high speed by a separate driving motor during a substantial part of the circuit about the center of the machine. At another region along the circuit, the buckets are loaded prior to entering the whirling zone while other buckets which have passed out of the whirling zone are unloaded. When the processing rate for the machine is two to three seconds per cake, two workers are normally required to load and unload the machine. The tedium and discomfort attendant to working in a confined or restricted space while attempting to manually supply and remove cakes from a machine operating at fixed speed with no production breaks has been reflected in unsatisfactory quality of machine output as well as unsatisfactory working conditions for personnel.

It is an object of the invention to provide an automatic means for removing annular articles from a continuously moving support. It is another object to provide an apparatus which will remove annular articles from a series of continuously moving containers and transfer them to a storage means; more specifically it is desired to provide apparatus capable of removing cakes of rayon yarn from circular cake-wringing machines which comprise a series of continuously moving buckets. Still another object is to reduce cost and manual effort in manufacturing processes involving the transfer of annular packages. Other objects, features, and advantages of the invention will be apparent from the following description of the invention and the drawing relating thereto in which:

Fig. 1 is a side elevation view of a portion of the cake extracting apparatus;

Fig. 2 is an end view of the apparatus illustrated in Fig. 1;

Fig. 3 is a sectional view of the apparatus illustrated in Fig. 1 taken along line III—III;

Fig. 4 is a plan view of the apparatus including also a cake receiving turntable and a portion of a circular cake centrifuging machine;

Fig. 5 is an elevation view partially in section of the apparatus shown in Fig. 4;

Fig. 6 is a section of an annular pneumatic cake gripping element, taken along its axis and along line VI—VI in Fig. 8;

Fig. 7 is a section taken along its axis of a shell for supporting the element illustrated in Fig. 6;

Fig. 8 is a sectional view of the element illustrated in Fig. 6 taken along the line VIII—VIII.

Fig. 9 is an exploded view in section of interrelated cams, motion bars, and gears contained in the head portion of the apparatus;

Fig. 10 is a fragmentary end view of the cam and gear driving mechanism for reciprocating the cake holder rack;

Fig. 11 is an elevation view showing the cam and motion bar therefor for swinging the head seen along section line XI—XI in Fig. 1;

Fig. 12 is an elevation view of the cam wheel for operating the cake pushing mechanism viewed in a direction along the drive shaft toward the right in Fig. 5;

Fig. 13 is an elevation view of the cam wheel for operating the head swinging and cake gripping mechanism viewed in a direction along the drive shaft toward the right in Fig. 5 showing in dotted outline a projection of the cam groove on the reverse side of the cam wheel; and Fig. 14 is a rear view of the cam wheel illustrated in Fig. 13.

In its broadest aspect the apparatus of the invention is used for removing spaced articles from a conveyor with which the movements of the apparatus are synchronized, and delivering the articles into or onto a receiver or storage device. The apparatus is particularly suitable for removing articles which must be removed in a direction normal to the direction of movement of the conveyor such as articles supported by conveyor elements having interior or exterior cylindrical supporting surfaces substantially normal to the direction of movement of the conveyor. The apparatus comprises a swingable housing containing a central shaft driven preferably from the conveyor driving means; a multiple cam and gear mechanism which reciprocates the housing in a path parallel to the direction of movement of the conveyor, also reciprocates an article gripping device in a direction normal to the direction of movement of the conveyor, and reciprocates means for pushing articles from the gripping device; and an article storage device operated in timed relationship with the gripping device.

As hereinafter described, the invention is particularly suitable for removing cakes of yarn from a centrifuging machine of a type such as described in U. S. Patent 1,986,434, and partly illustrated in Figs. 4 and 5 wherein liquid-laden cakes C are placed in centrifugal buckets 123 carried in a circular path. Soon after the insertion of a cake, the bucket containing it traverses a portion of the path in which the bucket and cake are rapidly rotated about their axis to expel the liquid; afterwards the bucket arrives at a point along the path usually near the point of cake loading at which the cake is removed. The apparatus herein described maintains a cake gripping element in alignment over a continuously moving bucket for a short period of time during which the gripping element descends into the center space of the cake, grips the inner walls of the cake, and extracts it from the bucket. The cake is carried upwardly and then swung laterally outwardly to a position wherein it is engaged by a pushing device which forces it from the gripping element onto a rod-like receiver. However, before the cake is pushed from the gripping element, the apparatus may execute a reverse swing with respect to the centrifuging machine to align the pushing device with the receiver before being positioned over the next preceding bucket carried by the machine.

Fig. 1 illustrates in side view the portion of the apparatus which is carried or suspended immediately over the rotatable buckets of a cake centrifuging machine of the above-described type designed to carry the buckets in a circular path. A shaft housing 20 supports what is herein referred to as a head 22 which comprises the entire assembly shown in Fig. 1 with the exception of the shaft housing. A shaft 24 constituting the driving means for the various rotary and reciprocating parts of the head extends along the axis of the housing 20 and centrally into the head 22.

The various motions executed by the head are derived from three rotary cams attached to the shaft. The first of these motions to be considered is that which results in the operation of a cake pushing member 46 and has its origin in the rotation of a cam wheel 26. The cam groove 25 of the cam wheel 26 shown also in Figs. 3 and 9, acts on a cam follower 27 secured to a cake pusher motion bar 28. A slot 29 permits the bar to reciprocate relative to the shaft 24. A rack gear 31 is secured to the lower portion of the bar to operate a gear train which produces reciprocal movement of a cake pusher carriage 34. The gear train actuated by the rack gear 31 comprises a small gear 35 mounted on the shaft 36 supporting also identical semi-circular gears 38 and 39 secured thereto. Gears 38 and 39 engage rack gears 41 and 42 secured to two parallel members 43 and 44 of the cake pusher carriage 34. A cake pusher 46 is secured to and supported by the ends of members 43 and 44. The parts just described are illustrated in exploded view in Fig. 9. Synchronism with the other movements executed by the machine may be obtained as hereinafter described.

The next cam assembly to be considered proceeding from left to right, in the assembly seen in Fig. 1 and the exploded view (Fig. 9), is that which produces swinging of the entire head relative to a motion bar 48. Motion bar 48 is secured at pivot 49 to a stationary part 50 of the centrifuging machine and remains practically motionless while the head 22 moves relative thereto, except for a slight pivoting action on the pin 49. A cam groove (referring to Fig. 11) recessed within the surface of cam wheel 53 facing to the left as viewed in Figs. 1 and 9 acts on a cam follower 55 secured to the motion bar 48. Motion bar 48 is provided with a slot 56 of sufficient length to permit reciprocation of the head at an amplitude which permits aligning of the cakeholder 90 carried by the head with successive buckets of the centrifuging machine. The slot 56 is of sufficient width to permit extension therethrough and reciprocation relative thereto of a hub 58 protruding from the cam wheel 26. The motion bar 48 extends through the side members of 60 and 61 of the head frame which in cooperation with the hub 58 act as guides for the motion bar. The cam groove 52 takes a contour hereinafter explained, shaped along one portion thereof to hold the head stationary on its swinging axis for a period during which the cake is pushed to a storage device. Another portion of the groove 52 causes the head to swing at a rate which maintains it exactly over a point or bucket of the centrifuging machine while a cake is extracted from the bucket. Another portion of the cam groove acts on the motion bar to return the head to a position over the next following bucket; the swinging cycle may then be repeated.

The cam wheel 53 is provided with a second cam groove 64 on the side opposite that containing the groove 52. Groove 64 acting through a series of inter-related parts controls the movement of the cake holder rack bar 66. On account of the considerable length needed to provide a stroke of adequate length for the cake holder 90, it is preferred not to drive the bar 66 directly from the cam wheel 53 because of the size of the cam wheel that would be needed to obtain the required amplitude of reciprocal movement of the cake holder rack bar 66 and the enlargement and extension of the other parts of the head which would complicate its construction. The effectiveness of the cam action obtained from the groove 64 is considerably increased by causing it to operate an intermediate motion bar 68 and a gear train. Accordingly, the groove 64 acts upon a cam follower 69 secured to the motion bar 68. In the apparatus shown, the motion bar 68 reciprocates in a direction parallel to that of the motion bar 28 and normal to the direction of motion in the head along the motion bar 48. It extends through apertures in the head frame members 70 and 71 which serve as guides therefor. The central portion of the motion bar 68 may be enlarged as shown in Fig. 10 to accommodate a slot 72 of sufficient width to permit extension therethrough of a small gear 73 secured or locked to the large gear 74 as shown in Fig. 9. The resulting gear combination comprising gears 73 and 74 turns freely with respect to the shaft 24 and is driven by rack teeth provided along one side of the slot 72 of the motion bar 68 meshing with the smaller gear 73.

The rack teeth may be provided, as shown in Fig. 10, by a rack gear element 77 contained within an appropriate recess provided therefor in the motion bar 68. The larger gear 74 of the combination gear 73 and 74 engages still another gear combination consisting of the small gears 79 and 80. These gears have a common axis and are locked together to prevent motion relative to each other. They are supported on a shaft 82 extending through and supported in the head frame in a region adjacent to the periphery of the gear 74. The smaller gear 80 meshes with teeth provided along the side of the rack bar 66. These gears may differ in size in accordance with the length of the movement desired. For example, in apparatus constructed along the lines of the apparatus herein described, the relationship of gear sizes is such that the length of movement of the rack bar 66 is approximately six times the length of the movement made by the motion bar 68. The rack bar 66 reciprocates in a direction parallel with the directions followed by the motion bars 28 and 68. The rack bar 66 is supported along the outer surface of the frame plate 83 and is guided therealong by a guiding assembly comprising a vertical guide bar 84 secured to the plate 83 and extending along one side of the rack bar 66, and elements 85 and 86 extending across the face of the bar as viewed in Fig. 2. The round portions of the elements 85 and 86 are recessed on the surfaces facing the head plate 83 to retain rollers or roller bearings between the elements and the head plate 83 which provide an antifrictional surface along which the rack bar 66 may slide when subjected to side thrust from the gear 80 driving the bar. Secured to the bar 66 on the side opposite the head plate 83 is a bar 88 extending almost the entire length of the bar 66 and hereinafter referred to as a timing rod used for operating a valve mechanism of the apparatus. The air supply to the cake holder 90 is controlled by a valve mechanism 91 comprising an inlet valve 94 and exhaust valve 95. Air or other fluid for inflating a pneumatic expandable element 124 in the holder 90 is supplied from a reservoir (not shown) to the valve 94 through an inlet tube 97. When the plunger 98 is engaged by the set screw 99 of the timing rod 88, the valve is opened and air flows into and through a flexible tube 101 to a port 102 through the side of the timing rod 88 into a passageway 103 which extends longitudinally through the timing rod from the port 102 to the lower extremity of the rod. To conduct the air from the passageway 103 of the rod, a pivotal joint 106 provided at the lower end of the rack bar 66 is bored and fitted to provide a passageway contiguous with one end of a flexible tube 109 connected with passageway 103. The passageway through the joint 106 is also contiguous with a passageway 108 through a tiltable member of a bell-crank 105 supporting the cake holder 90. Air supplied to the holder 90 may be released through the exhaust valve 95 by upward movement of the rack bar 66 and the timing rod 88 to the height which results in engagement of the set screw 111 with the plunger 112 of the valve 95. Releasing of air from the holder 90 results in deflation of the pneumatic cake gripping element 124 hereinafter described in greater detail.

The member 105 comprises also an arm 115 terminating in a support for an anti-friction device such as the roller bearing 116. In the lower portion of the reciprocable range traversed by the assembly comprising the rack bar 66, timing rod 88, member 105 and holder 90, the member 105 and holder 90 are in alignment with the rack bar. However as the assembly is moved away from the centrifuging machine and the cake holder is lifted clear of a bucket of the machine, the outer surfaces of the bearing 116 engage the surface of a stationary cam 118 secured to the head frame 83. As the assembly proceeds upward or away from the machine, the member 105 and the holder are tilted out of alignment with the rack bar and to a sidewise position into substantial alignment with a spoke of a cake storing turntable 120 shown in Fig. 4. The holder 90 is also tilted into the region traversed by the cake pusher 46 carried by the pusher carriage 34. The timing of cam grooves 64 and 25 are such that as the rack bar and timing rod assembly reach the point of greatest departure from the centrifuging machine, the cake pusher assembly starts movement to the right as viewed in Fig. 1. The cake pusher 46 is U shaped and its path of movement is so aligned that it straddles the cake holder and thereby engages a cake supported on the holder during movement to the right as viewed in Fig. 1. The rack bar and timing rod assembly may be held stationary during the cake removing operation. The head 22 of the apparatus is preferably held stationary during the cake removing operation in order to maintain the head in alignment with a spoke of the turntable 120. However retraction of the cake holder carriage may be made concurrently with the swinging movements of the head 22.

The cake holder of the invention may take the form illustrated in Figs. 6, 7 and 8 comprising a resiliently expandable element 124 such as of rubber suspended within a rigid cage 125 by an annular plate 129 which is provided with a threaded aperture through which the exteriorly threaded fitting 129a of the element 124 is extended. The plate 129 is secured within the larger end of the cage 125 by such means as screws. Fig. 8 is a cross-sectional view of the element as seen along line VIII—VIII of Fig. 6 with axial extending portions of the cage 125 added to illustrate the spacial relationship of the cake gripping surfaces of both the element and the cage. Surfaces 127 of the element are forced radially outward when the pressure is increased within the element. In the deflated condition these surfaces remain radially inward of the outer surfaces 128 of the cage sections 130 so as not to rub against the inner surface of the yarn contacted by the holder 90 during insertion thereof. The outer surfaces of the cage 125 although smooth and polished are smaller in diameter than the inner surface of the cake and permit easy entry of the holder 90 into the cake when the element 124 is deflated. However, after the holder is completely inserted, the element 124 may be inflated whereby the surfaces 127 move radially outwardly beyond the surfaces 128 to grip the cake. Thereafter the holder may be moved in such a manner as to extract the cake from a bucket. When the holder is moved upwardly to the tilted position hereinbefore described wherein the cake is about to be pushed off the holder, the inflation pressure is released by engagement of the set screw 111 with the plunger 112 to permit withdrawal of the gripping surfaces to a position radially inwardly of surfaces 128 and the cake may be readily pushed off the holder while supported only by the smooth surfaces of the cage 125.

Fig. 4 shows in plan view the turntable 120 in position for receiving cakes from the holder 90. Fig. 5 illustrates a single mechanism for driving the centrifuging machine, the cake extracting apparatus, and the turntable. All the machinery shown and illustrated in the figures may be driven by a motor 122 geared to a shaft 123 which drives the large ring-like member 132 supporting the buckets 133 by a pinion gear 123a in mesh with a large ring gear 132a supported concentrically on the member 132. The member 132 rotates with respect to its supporting base upon a ball bearing 132b. Independent driving means 126 are provided for rotating each of the buckets 133. The drive to the head 22 of the cake extracting apparatus may be transmitted as shown from shaft 123 through the set of bevel gears 130 to a shaft 131. Shaft 24 is driven by the shaft 131 through the bevel gears 137 attached to adjacent ends of the shafts. The cake extracting assembly pivots about the center of rotation for the ring member 132 and about the shaft 131 aligned along the pivoting axis. A pedestal 134 serving as a housing for the shaft 131 constitutes the main support on which the assembly comprising the shaft 24, a housing 136, housing 20, and the head 22 are supported and pivoted. The upper portion of the pedestal 134 extends into the housing 136 in telescopic and rotatable relationship for stable support of the swingable assembly. The swingable assembly is oscillated with reference to its axis along the shaft 131 by cam means, hereinbefore described, along the motion bar 48 pivotably connected with a bracket 50 mounted on the top of a cover portion 140 of the centrifuging machine.

The turntable 120 receives the cakes on spoke-like members 141 extending from a hub 142 mounted on a vertical rotatable shaft 143. The members 141 may be tilted upward as illustrated in Fig. 5 at an angle such as in the range of 15 to 30 degrees from the horizontal to facilitate sliding of the cakes toward the hub. A spoke 141 in alignment with the holder 90 receives cakes from the extracting apparatus. After the spoke is loaded with several cakes, the turntable 120 is rotated until another spoke is in alignment with the apparatus. Mechanism for providing the intermittent rotation necessary to align each of the several spokes 141 for receiving the cakes comprises a cam operated pawl and ratchet mechanism. As shown in Fig. 5, a bevel gear 144 secured to the shaft 123 drives a gear reduction unit 145 for supporting and rotating a cam 146. Cam 146 acts on a cam follower 148 to oscillate the lever 150 to which it is attached. The motion executed by the oscillating end of the lever 150 is carried to the ratchet wheel secured on the shaft 143 to impart intermittent rotation of the turntable 120 by a lever train comprising a rod 152, a pivotable lever 153, and a push rod 154, the train terminating in a lever 155 which pivots on the shaft 143 and supports the pawl 156 pressed by a spring 157 against the teeth of the ratchet 158. The ratio of the gears and the lengths of the levers just described are such that the reciprocal movement produced in the lever chain causes rotation of the turntable for an angular distance equal to the angular distance between the spokes 141 after a predetermined number of cakes have been collected on a single spoke. For example, apparatus has been constructed which rotates the turntable to a new position after six cakes have been collected on one spoke.

The operation of the apparatus herein described is dependent upon the shaft and the synchronous relationship of the various cams which control cyclic movements of the apparatus. It is particularly important in the operation of the apparatus to have movements of the cake pushing device, the head swinging mechanism, and the cake holder reciprocating mechanism occur in precise timed relationship. Figs. 12 and 13 illustrate the relationship of the cams and cam followers which control these movements, and the position of any reciprocating parts at any instant in the operation of the machine may be determined from a study of these figures. To facilitate the study of these figures the peripheries of the cam wheels are marked off to correspond to the divisions of a clock face. The relative positions of the cams may then be described by reading them as from a clock face. For example, the cam follower 27 of Fig. 12 is in the 6 o'clock position. To determine the phase relationships of the various parts of the machine, it will be important to take particular note of the position of the cam followers relative to each other. For example, cam follower 55 actuated by the cam groove 52 is displaced 90° from the cam followers 69 and 27 with respect to the rotating axis of the cams, in order to permit its reciprocation in a direction at right angles with the movement of the other cam followers. Figs. 12 and 13 illustrate the faces of the cam wheels as seen when looking along the shaft 24 from the swinging axis of the head 22 taken along the shaft 131. Fig. 14 illustrates the reverse side of the cam wheel shown in Fig. 13. Fig. 14 has been marked off by numbers in a counterclockwise direction in order to identify corresponding points of the cam groove 64 by numerals that are the same as those on the other cams.

The cam wheels are shown in Figs. 12, 13 and 14 in their relative positions as they occur at one instant during operation of the apparatus of the invention. In this position the cam follower 27 is at the position which corresponds to the most retracted position of the cake pusher 46. It will be observed from Fig. 12 that the cam groove is approximately circular from 1:30 o'clock in a clockwise direction to 7:30 o'clock indicating that the cam groove remains in the retracted position for at least 180° of rotation of the cam wheel 26. The remaining 180° of the cam, that is, the portion between 7:30 and 1:30, is contoured to an eccentricity which causes this portion of the groove to act on the cam follower 27 in a uniform up and down movement. Fig. 13 shows the cam follower 55 in the 3 o'clock position in contact with that portion of the cam groove 52 which causes the swinging head of the apparatus to move with respect to the motion bar 48 in synchronism with the movement of the centrifugal buckets of the cake-wringing machine. As illustrated, the head is approximately half way through the bucket-following stroke of the head 22. The cam groove 64 shown in dotted outline in Fig. 13 on the reverse side of cam wheel 53, is in the position wherein the cam follower 69 is forced to its farthest downward position.

This position of follower 69 corresponds to the most downward position of the cake holder 90 and its supporting rack bar 66 as illustrated in Fig. 5 wherein the cake holder is shown completely inserted within a cake contained in the bucket 125.

Positions of the various parts comprising the head 22 may be determined for any instant from Figs. 12 and 13 by assuming a certain angular location along the cam grooves 25, 52, and 64 corresponding to a specific clock position, for example 10:30 o'clock. It should be remembered, however, that in determining the positions of the various parts of the apparatus at any specific instant that the cam follower 55 operating within the groove 52 and controlling the swinging movement of the apparatus is 90° in a counterclockwise direction from the cam followers 27 and 69 mounted on vertical reciprocating bars. In interpreting Figs. 12 and 13, it is necessary to drop back three clock divisions (i. e., 3 hours) to find the point on the cam groove 52 corresponding in time relationship with the specific position named for the cam followers 27 and 69 in their respective grooves.

To illustrate the use of Figs. 12 and 13 to determine the position of various parts of the machine, a cam position may be selected at random and identified by a corresponding clock position while a comparison is made with the other cams illustrated in Figs. 12 and 13. For example, when the cam wheels are in such a position that cam followers 27 and 69 are in their respective cam grooves at points represented by 10:30 o'clock, the point on the cam groove 52 represented by 7:30 o'clock is in contact with the cam follower 55 for the reason hereinbefore stated. At this instant in the operation of the apparatus, the cake pusher 46 is in its most outward position and at the end of the stroke during which it removes a cake from the holder 90; the cam follower 55 is traversing a point along the groove 52 indicated by 7:30 o'clock which is approximately midway along the portion of the groove having a uniform radius extending between 6 o'clock and 8:30 o'clock in Fig. 13. This portion of the groove 52 as it passes by the cam follower 55, holds the head 22 of the apparatus in a stationary position for a short time interval during which the cake may be pushed from the cake holder 90 onto a receiver 141. As the 10:30 o'clock point on the cam groove 64 passes the cam follower 69, the cake holder bar 66, in response thereto occupies its most retracted position with relation to the buckets of the centrifuging machine. The 10:30 o'clock position of groove 64 is approximately at the end of a circular portion of constant radius which maintains the cake holder 90 and the bar 66 in the upward position. As the cam wheel continues to turn from the 10:30 o'clock position, the eccentric portion of the cam groove 64 passes by the cam follower 69 and forces it radially outward or downward with respect to the center of the cam wheel causing also the cake holder 90, responsive thereto, to execute a corresponding downward movement. Referring to Fig. 13, the downward movement of the cake holder is controlled by the eccentric portion of the cam groove 64 aligned approximately between 9 o'clock and 6 o'clock. The portion of head swinging groove 52 which agrees in time relationship with the portion of groove 64 just named lies between 6 o'clock and 3 o'clock; this portion of the groove 52 produces concurrent movement of the head with the bucket 133. The corresponding portion of the groove 25 in Fig. 12 is that lying between 9 o'clock and 6 o'clock which causes no movement of the cake pusher 46 as it passes by the cam follower 27.

In the extracting machinery herein described synchronism of the various parts is obtained by driving the centrifuging machine, the cake extracting apparatus and the turntable storage device from a common driving means. However, separate driving means may be employed in any manner to drive the separate portions of any of the machinery named in timed relationship with each other. The cake extracting head in the embodiment described, swings with respect to an annular conveyor for rayon cake centrifuging buckets but it may be adapted to many other circular conveying devices, or it may be attached to conveyors which carry articles in a straight path by mounting the head 22 on a slide bar or track not shown and providing it with an independent driving means so that it may reciprocate instead of pivot.

By means of the invention, articles such as typified by rayon cakes uniformly spaced and carried on a continuous conveyor, may be removed by mechanical means rather than manual effort at less cost. The machine is adaptable to rates of handling articles beyond the capacity of workers doing the same operation manually. The machine is automatic in operation, compact, and easily adaptable to conveyors of various sizes, and articles carried thereon of various shapes and sizes.

While a preferred embodiment of the invention has been shown, it is to be understood that changes and variations may be made without departing from the spirit and scope of the invention as defined in the appended claims.

We claim:

1. Apparatus for removing articles from an endless running conveyor comprising means for lifting such articles from the conveyor, means for supporting the lifting means over the conveyor, means for reciprocating the supporting means through forward strokes and return strokes parallel to the movement of the conveyor, means for synchronizing the movements of the conveyor and the supporting means to maintain the lifting means in alignment over a series of predetermined points spaced lengthwise of the conveyor during forward strokes of the supporting means, means synchronously connected with the first-named reciprocating means for reciprocating the lifting means in an advance movement toward, and a return movement away from, each of said points substantially during the forward stroke of the first-named reciprocating means, means for tilting the lifting means during each movement away from the conveyor in a lateral direction with respect to the direction of such movement, and means operated in synchronism with the reciprocating means and the tilting means for disengaging the article from the lifting means in the tilted position thereof.

2. Apparatus for removing articles from an endless running conveyor comprising means for lifting such articles from the conveyor, means for supporting the lifting means over the conveyor, means for reciprocating the supporting means through forward strokes and return strokes parallel to the movement of the conveyor, means for synchronizing the movements of the conveyor and the supporting means to maintain the lifting means in alignment separately over each of a series of predetermined points spaced lengthwise of the conveyor during separate forward strokes of the supporting means, means synchronously connected with the first-named reciprocating means for reciprocating the lifting means in an advance movement toward, and a return movement away from, each of said points substantially during the forward stroke of the first-named reciprocating means, means for tilting the lifting means during each of said return movements thereof in a direction that is lateral with respect to the general direction of said advance and return movements, and means operated in synchronism with the reciprocating means and the tilting means for disengaging the article from the lifting means when disposed in its tilted position.

3. Apparatus for removing articles from an endless running conveyor comprising means for gripping such articles, means for supporting the gripping means over the conveyor, means for reciprocating the supporting means through forward strokes and return strokes parallel to the movement of the conveyor, means for synchronizing the movements of the conveyor and the supporting means to maintain the gripping means in alignment separately over each of a series of predetermined points spaced lengthwise of the conveyor during separate forward strokes of the supporting means, means synchronously connected with the first-named reciprocating means for reciprocating the gripping means in an advance movement toward, and a return movement away from, each of said points substantially during the forward stroke of the first-named reciprocating means, means for tilting the gripping means during the return movement of the gripping means in a lateral direction with respect to said movement, control means for actuating the gripping means to grip and release the article, and means for synchronizing the control means and the reciprocating means and the tilting means whereby the gripping means engages the article at approximately the point of closest approach to the conveyor and releases the article immediately after actuation of the tilting means.

4. Apparatus as defined in claim 3 comprising also means operated in synchronism with the reciprocating means and the tilting means for disengaging the article from the gripping means after actuation of the control means to release the article.

5. Apparatus for removing annular articles from an endless running conveyor comprising expandable means for gripping the inner surfaces of such articles, means for supporting the gripping means over the conveyor, means for reciprocating the supporting means through forward strokes and return strokes parallel to the movement of the conveyor, means for synchronizing the movements of the conveyor and the supporting means to maintain the gripping means in alignment separately over each of a series of predetermined points spaced lengthwise of the conveyor during separate forward strokes of the supporting means, means synchronously connected with the first-named reciprocating means for reciprocating the gripping means in an advance movement toward, and a return movement from, each of said points substantially during the forward stroke of the first-named reciprocating means, each of said articles being supported on the conveyor with its axis approximately normal with the conveyor and contiguous with one of said points, control means for expanding and contracting the gripping means, means for tilting the gripping means during return movements thereof in a direction lateral with respect to the general direction of such movements, means for synchronizing the control means with the reciprocating means whereby the gripping means expands into engagement with the article at approximately the point of closest approach to the conveyor and contracts to release the article after actuation of the tilting means, and means for receiving the article disposed in a position that is laterally spaced in the direction in which the gripping means is tilted from the path traversed by the gripping means during said advance and return movements thereof.

6. Apparatus as defined in claim 5 wherein the tilting means comprises cam and cam-following means associated with the support means and the second-named reciprocating means, and the receiving means comprises means connected in synchronism with the supporting means and the conveying means for periodically aligning separate fractions of the receiving means with the tilted position of the gripping means, said apparatus comprising also means mounted movably on the supporting means in synchronism with the second-named reciprocating means for pushing an article from the gripping means onto the receiving means.

7. Apparatus for removing articles from an endless running conveyor comprising means for gripping such articles, means for supporting the gripping means over the conveyor, means for reciprocating the supporting means through forward strokes and return strokes parallel to the movement of the conveyor, and means for driving the conveyor and the reciprocating means in synchronized relationship to maintain the gripping means in alignment separately over each of a series of predetermined points spaced lengthwise of the conveyor during separate forward strokes of the supporting means, cam and reciprocal means connected with the driving means for producing an advance movement and a return movement of the gripping means during each forward stroke of the reciprocating means in a direction toward and away from each of said points, fluid means for operating the gripping means, control means for actuating the fluid means mounted on said cam and reciprocal means, means mounted on the supporting means spaced at predetermined points along the ambit of the cam and reciprocal means to engage the control means, said gripping means mounted in hinged relationship on the cam and reciprocal means, cam and cam following means associated with the supporting means and the gripping means for tilting the gripping means during return movements thereof, and means comprising a cam drive and reciprocal means connected with said driving means for pushing the article from the gripping means.

8. Apparatus for removing articles from an annular running conveyor comprising means for lifting such articles from the conveyor, means pivotably mounted at the axis of the conveyor for supporting the lifting means over the conveyor, means for reciprocating the supporting means through forward strokes and return strokes, means for synchronizing the movements of the conveyor and the supporting means to maintain the lifting means in alignment separately over each of a series of predetermined points spaced lengthwise of the conveyor during forward strokes of the supporting means, means synchronously connected with the first-named reciprocating means for reciprocating the lifting means in an advance movement toward, and a return movement away from, each of said points substantially during the forward stroke of the first-named reciprocating means, said lifting means being mounted on the second-named reciprocating means in pivotable relationship, cam and cam-follower means associated with the supporting means and the gripping means for tilting the latter during said return movements, and means operated in synchronism with the reciprocating means for disengaging the article from the lifting means after actuation of the cam tilting means and during movement of the second-named reciprocating means away from the conveyor.

9. Apparatus for removing articles from an annular running conveyor comprising expandable means for gripping such articles, means pivotably mounted at the axis of the conveyor for supporting the lifting means over the conveyor, means for reciprocating the supporting means through forward strokes and return strokes, means for synchronizing the movements of the conveyor and the supporting means to maintain the gripping means in alignment separately over each of a series of predetermined points spaced lengthwise of the conveyor during forward strokes of the supporting means, means synchronously connected with the first-named reciprocating means for reciprocating the gripping means in an advance movement toward, and a return movement away from, each of said points, substantially during the forward stroke of the first-named reciprocating means, said lifting means being mounted on the moving means in hinged relationship, cam and cam following means associated with the supporting means and the gripping means for tilting the latter during return movements, fluid control means for actuating the gripping means to grip or release the article, means for connecting the control means in synchronism with one of the reciprocating means whereby the gripping means engages the article at approximately the point of closest approach to the conveyor and releases the article as the gripping means assumes its tilted position.

10. Apparatus for removing annular articles from an annular running conveyor comprising gripping means adapted to be inserted within such articles to engage the inner surfaces thereof, means pivotably mounted at the axis of the conveyor to support the gripping means over the conveyor, means for reciprocating the supporting means through forward strokes and return strokes, means for synchronizing the movements of the conveyor and the supporting means to maintain the gripping means in separate alignment over each of a series of predetermined points spaced lengthwise of the conveyor during forward strokes of the supporting means, said conveyor comprising circular containers for the articles, each container being approximately centered with respect to one of said points with its axis extending toward the gripping means during forward strokes, means synchronously connected with the first-named reciprocating means for reciprocating the gripping means in an advance movement toward, and a return movement away from, each of said points substantially during the forward stroke of the first-named reciprocating means, said gripping means being mounted on the moving means in hinged relationship, cam and cam following means associated with the supporting means and the gripping means for tilting the latter during return movements, fluid control means for actuating the gripping means to grip or release an article, means for synchronizing the control means in time relationship with the reciprocating means whereby the gripping means engages the article at approximately the point of closest approach to the conveyor and releases the article as the gripping means reaches its tilted position.

11. An apparatus for removing annular articles from an annular conveyor which carries each article in a closely fitting open-top container comprising an insertable gripper for the articles having a fluid expandable resilient element, a fluid supply means in connection with the expandable element, valve means for controlling the flow of fluid to and from the supply means and the element, a pivotable housing extending from the center of the circle formed by the conveyor and terminating in a head portion swingably supported above the conveyor, a drive shaft in synchronism with the conveyor extending through the housing and into the head portion, a two member supporting carrier for the gripper comprising an elongate rack-toothed member slidably supported for reciprocable movement toward the conveyor and a bell crank member to which the elongate member is pivotably connected on the end thereof nearest the conveyor, the gripper being secured to one arm of the bell crank and the cam follower being secured to the other arm, a first motion bar extending through the head portion reciprocable along a path normal to the shaft axis and approximately parallel to the pivoting axis of the housing, a cam follower secured to the first motion bar, cam means secured to the shaft acting on the cam follower of the first motion bar, intermediate gear means meshing with the teeth of the first motion bar and the rack teeth of the carrier; a second motion bar extending through the head portion for reciprocating the head portion along a path normal to the shaft and lying in a plane approximately normal to the pivoting axis of the housing, the second motion bar being supported at one end by a stationary support, a cam follower mounted on the second bar, cam means secured to the shaft engaging the cam follower of the second motion bar, a third motion bar provided with rack teeth and reciprocable with respect to the head portion along a path normal to the shaft and parallel to the pivoting axis of the housing, a reciprocable carriage provided with a rack gear and supported by the head portion for movement along a path extending between and laterally adjacent to the most retracted position of the gripper and the path of the third motion bar, gear means meshing with the rack teeth of the third motion bar and the carriage, and an article pushing element secured to the carriage.

12. An apparatus as in claim 11 wherein the cam means for driving adjacent motion bars comprise a single cam wheel having a cam surface on each side of the wheel.

13. An apparatus as in claim 11 wherein the cam means for driving the first and second motion bars comprise a single cam wheel having a cam surface on each side of the wheel.

References Cited in the file of this patent

UNITED STATES PATENTS

| Number | Name | Date |
| --- | --- | --- |
| 1,362,286 | Gerhardt | Dec. 14, 1920 |
| 1,424,587 | Perry | Aug. 1, 1922 |
| 1,433,642 | Olson | Oct. 31, 1922 |
| 1,461,222 | Myers | July 10, 1923 |
| 1,694,719 | Plum 2d, et al. | Dec. 11, 1928 |
| 1,888,440 | Waugh, Jr. | Nov. 22, 1932 |
| 1,909,700 | Maurer | May 16, 1933 |
| 1,943,483 | Miller | Jan. 16, 1934 |
| 1,947,610 | McNamara | Feb. 20, 1934 |
| 1,999,742 | Smith | Apr. 30, 1935 |
| 2,198,976 | Rober | Apr. 30, 1940 |
| 2,215,458 | Backhouse | Sept. 24, 1940 |
| 2,290,409 | Cuthill | July 21, 1942 |
| 2,301,747 | Peterson | Nov. 10, 1942 |
| 2,301,892 | Lewis | Nov. 10, 1942 |
| 2,308,209 | Schmutzer | Jan. 12, 1943 |
| 2,468,405 | Miller | Apr. 26, 1949 |